US 7,887,957 B2

(12) United States Patent
Shiga et al.

(10) Patent No.: US 7,887,957 B2
(45) Date of Patent: Feb. 15, 2011

(54) NON-AQUEOUS AIR BATTERY AND CATALYST THEREFOR

(75) Inventors: Tohru Shiga, Okazaki (JP); Hideyuki Nakano, Owariasahi (JP); Haruo Imagawa, Nagoya (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 169 days.

(21) Appl. No.: 12/130,068

(22) Filed: May 30, 2008

(65) Prior Publication Data

US 2008/0299456 A1      Dec. 4, 2008

(30) Foreign Application Priority Data

Jun. 1, 2007   (JP) .............. 2007-146762

(51) Int. Cl.
*H01M 8/22*   (2006.01)
*H01M 4/36*   (2006.01)
*H01M 4/60*   (2006.01)

(52) U.S. Cl. ............... 429/405; 429/212; 429/402; 429/403

(58) Field of Classification Search .............. 429/212
See application file for complete search history.

(56) References Cited

U.S. PATENT DOCUMENTS 4,407,907 A * 10/1983 Takamura et al. ............ 429/42

2003/0013606 A1 *  1/2003  Hampden-Smith et al. .. 502/180
2004/0241537 A1 * 12/2004  Okuyama et al. ............. 429/86
2006/0063051 A1 *  3/2006  Jang ........................... 429/29

FOREIGN PATENT DOCUMENTS

JP   2003-178816    6/2003
JP   2006-286414   10/2006

OTHER PUBLICATIONS

Ikemoto et al., Porphyrin-Oligothiophene-Fullerene Triads as an Efficient Intramolecular Electron-Transfer System, Jan. 2002, Organic Letters, 4, 309-311.*

Hayashi et al., Synthesis and structural and electronic properties of the octaethylporphyrin-dihexylbithiophene-fullerene derivatives (OEP-DHBTh-C60) connected with diacetylene linkage, Oct. 2005, Tetrahedron Letters, 46, 6961-6965.*

(Continued)

*Primary Examiner*—Robert Hodge
*Assistant Examiner*—Sean P Cullen
(74) *Attorney, Agent, or Firm*—Oblon, Spivak, McClelland, Maier & Neustadt, L.L.P.

(57)   ABSTRACT

A non-aqueous air battery of the present invention includes a negative electrode for which a material which absorbs and releases lithium ions is used as a negative electrode active material, a positive electrode for which oxygen is used as a positive electrode active material, and a non-aqueous electrolyte disposed between the negative electrode and the positive electrode. The positive electrode contains a donor-acceptor molecule in which an electron-donating donor (D) having a porphyrin ring is connected to an electron-accepting acceptor (A) composed of a fullerene derivative, with a conductive spacer therebetween. An example of the donor-acceptor molecule is triphenylporphyrinyl bithienyl N-methylpyrrolidino [60]fullerene.

OTHER PUBLICATIONS

U.S. Appl. No. 11/968,414, filed Jan. 2, 2008, Haruo Imagawa, et al.

Takeshi Ogasawara, et al., "Rechargeable $Li_2O_2$ Electrode for Lithium Batteries", J. Am. Chem. Soc., vol. 128, No. 4, 2006, pp. 1390-1393.

K. M. Abraham, et al., "A Polymer Electrolyte-Based Rechargeable Lithium/Oxygen Battery", J. Electrochem. Soc., vol. 143, No. 1, Jan. 1996, pp. 1-5.

J. P. Zheng, et al., "Theoretical Energy Density of Li-Air Batteries", Journal of the Electrochemical Society, vol. 155, No. 6, 2008, pp. A432-A437.

Aurélie Débart, et al., "An $O_2$ cathode for rechargeable lithium batteries: The effect of a catalyst", Journal of Power Sources, vol. 174, 2007, pp. 1177-1182.

Tohru Shiga, et al., "Photosensitization of nanoporous $TiO_2$ film with porphyrin-linked fullerene", Thin Solid Films, vol. 516, 2008, pp. 1204-1208 and cover page.

20 Claims, 4 Drawing Sheets

* cited by examiner

Discharge capacity per unit weight of positive electrode member (mAh/g)

FIG. 5

Discharge capacity per unit weight of positive electrode member (mAh/g)

FIG. 6

Discharge capacity per unit weight of positive electrode member (mAh/g)

FIG. 7

Discharge capacity per unit weight of positive electrode member (mAh/g)

_US 7,887,957 B2_

NON-AQUEOUS AIR BATTERY AND CATALYST THEREFOR

BACKGROUND OF THE INVENTION

1. Field of the Invention

The present invention relates to a non-aqueous air battery and a catalyst used for the battery. More specifically, the present invention relates to a non-aqueous air battery including a negative electrode for which a material which absorbs and releases lithium ions is used as a negative electrode active material, a positive electrode for which oxygen is used as a positive electrode active material, and a non-aqueous electrolyte disposed between the negative electrode and the positive electrode, and a catalyst used for the battery.

2. Description of the Related Art

Recently, markets of mobile information devices such as cell phones and email terminals have been rapidly expanding. Furthermore, from the standpoint of environmental problems and impending energy crisis, hybrid cars and electric cars have been attracting attention. In light of this background, high-energy power storage devices have been developed.

Lithium has a standard reduction potential of −3.05 V and is the least noble metal in the electrochemical series. Therefore, the operating voltage of a power storage device having a lithium negative electrode is high, and a high-energy device can be realized. In addition, since lithium has the smallest atomic weight among metals, the theoretical capacity of such a device is very high; 3,862 mAh/g. Accordingly, the use of lithium as a negative electrode can provide a power storage device having a high energy density.

On the other hand, a chargeable/dischargeable air battery is known in which a metal is used as a negative electrode active material and oxygen in air is used as a positive electrode active material. In such an air battery, it is expected that a battery with a high capacity can be realized because oxygen serving as the positive electrode active material need not be provided in the battery. In air batteries in which lithium is used as a negative electrode active material, an electrochemical reaction of oxygen occurs at the positive electrode, thereby producing lithium peroxide and lithium oxide during discharging. These oxides are decomposed during charging to generate oxygen gas. In order to accelerate this oxidation-reduction reaction of oxygen at the positive electrode, a catalyst is often added to the positive electrode. For example, according to Japanese Unexamined Patent Application Publication No. 2006-286414, cobalt phthalocyanine or cobalt porphyrin is carried on the surface of a positive electrode as a catalyst. In addition, according to Journal of American Chemical Society, Vol. 128, pp. 1390 to 1393, 2006, electrolytic manganese dioxide is carried on a positive electrode.

SUMMARY OF THE INVENTION

In such air batteries including the above-mentioned catalyst, the performance of the catalyst is not sufficient, and thus it is difficult to achieve a high discharge capacity.

The present invention has been made in order to solve the above problem, and it is an object of the present invention to provide a non-aqueous air battery which has high discharge capacity, and a catalyst used for the battery.

In order to achieve the above object, the present inventors added, as a reduction catalyst, to a positive electrode of a non-aqueous air battery, a compound in which triphenylporphyrin is connected to a fullerene derivative prepared by fusing pyrrolidine to fullerene $C_{60}$, with bithiophene therebetween. As a result, the present inventors found that the non-aqueous air battery had a markedly high discharge capacity as compared with the case where another reduction catalyst (electrolytic manganese dioxide or tetraphenylporphyrin) was added to the positive electrode. This finding led to the realization of the present invention.

More specifically, a non-aqueous air battery of the present invention includes a negative electrode for which a material which absorbs and releases lithium ions is used as a negative electrode active material, a positive electrode for which oxygen is used as a positive electrode active material, and a non-aqueous electrolyte disposed between the negative electrode and the positive electrode, wherein the positive electrode contains a donor-acceptor molecule in which an electron-donating donor (D) having a porphyrin ring is connected to an electron-accepting acceptor (A) composed of a fullerene derivative, with a conductive spacer therebetween.

A catalyst for a non-aqueous air battery of the present invention is a catalyst which is capable of accelerating a reductive reaction and which is added to a positive electrode of the non-aqueous air battery. The catalyst is composed of a donor-acceptor molecule in which an electron-donating donor (D) having a porphyrin ring is connected to an electron-accepting acceptor (A) composed of a fullerene derivative, with a conductive spacer therebetween.

According to the non-aqueous air battery of the present invention, a markedly high discharge capacity can be realized as compared with the case where an existing reduction catalyst is added to a positive electrode. The reason why this effect can be achieved is not known. However, it is believed that the fullerene derivative, which functions as an acceptor, not only takes lithium ions into the spherical shell thereof but also contributes to the reduction of oxygen on the surface thereof, and that the porphyrin ring, which functions as a donor, also contributes to the reduction of oxygen. Accordingly, it is believed that such a high energy density can be realized by the synergistic effect of these contributions.

DESCRIPTION OF THE PREFERRED EMBODIMENTS

In the non-aqueous air battery of the present invention, a negative electrode contains a material which absorbs and releases lithium ions as a negative electrode active material. Examples of the material which absorbs and releases lithium ions include metal lithium, lithium alloys, metal oxides, metal sulfides, and carbonaceous substances which absorb and release lithium ions. Examples of the lithium alloys include alloys of lithium and aluminum, tin, magnesium, indium, or calcium. Examples of the metal oxides include tin oxides, silicon oxides, lithium-titanium-oxide, niobium oxides, and tungsten oxides. Examples of the metal sulfides include tin sulfides and titanium sulfides. Examples of the carbonaceous substances which absorb and release lithium ions include graphite, coke, mesophase pitch carbon fiber, spherical carbon, and resin-burned carbon.

In a positive electrode of the non-aqueous air battery of the present invention, oxygen is used as a positive electrode active material. Note that oxygen need not be provided in the battery because oxygen contained in air is utilized. The positive electrode contains, as a reduction catalyst, a donor-acceptor molecule in which an electron-donating donor (D) having a porphyrin ring is connected to an electron-accepting acceptor (A) composed of a fullerene derivative, with a conductive spacer therebetween. In the donor-acceptor molecule, examples of the donor (D) include porphyrin, cytoporphyrin, uroporphyrin, coproporphyrin, hematoporphyrin, mesoporphyrin, protoporphyrin, rhodoporphyrin, phylloporphyrin, etioporphyrin, pyrroporphyrin, deuteroporphyrin, chlorin, bacterioporphyrin, isobacteriochlorin, porphyrinogen, phorbin, phytoporphyrin, porphyrazine, and phthalocyanine. These donors may be unsubstituted or may have a substituent such as an alkyl group (e.g., a methyl group, an ethyl group, a n-propyl group, an isopropyl group, a n-butyl group, a sec-butyl group, an isobutyl group, or a tert-butyl group), an alkenyl group (e.g., a vinyl group or an allyl group), or an aryl group (e.g., a phenyl group or a tolyl group). Among these, in view of, for example, availability, triphenylporphyrin is preferred. Each of these porphyrin rings may be a porphyrin which does not have a metal ion or a porphyrin metal complex having a metal ion such as a Mg ion or a Ni ion. The acceptor (A) is preferably a fullerene derivative in which, for example, at least one of a nitrogen-containing heterocyclic ring and a hydrocarbon ring is fused to a fullerene skeleton of $C_{60}$, $C_{70}$, $C_{74}$, $C_{76}$, $C_{78}$, $C_{80}$, $C_{82}$, $C_{84}$, $C_{90}$, or $C_{96}$. The spacer preferably connects the fused nitrogen-containing heterocyclic ring or hydrocarbon ring to the donor. As the fullerene skeleton, fullerene $C_{60}$ is preferable from the standpoint that the production cost thereof is low. As the nitrogen-containing heterocyclic ring, a pyrrolidine ring is preferable from the standpoint of the ease of synthesis. The nitrogen atom of the pyrrolidine ring may be unsubstituted or may have a substituent such as an alkyl group, an alkenyl group, or an aryl group selected from the groups mentioned above. Examples of the hydrocarbon ring include saturated hydrocarbon rings, such as a cyclopropane ring, and unsaturated hydrocarbon rings, such as a cyclohexene ring. In the case where a plurality of nitrogen-containing heterocyclic rings or hydrocarbon rings are fused, it is sufficient that one of the rings is connected to the donor, with the spacer therebetween. Furthermore, the fused nitrogen-containing heterocyclic ring or hydrocarbon ring may have a substituent such as an alkyl group, an alkenyl group, or an aryl group selected from the groups mentioned above, or an ester group. The spacer is not particularly limited as long as the spacer has conductivity. Examples thereof include compounds in which a plurality of thiophene rings are bonded to each other, e.g., bithiophene, tetrathiophene, hexathiophene, octathiophene, 3-hexylbithiophene, 3-butylbithiophene, and 3-octylbithiophene. Each of the thiophene rings may have a substituent such as an alkyl group, an alkenyl group, or an aryl group selected from the groups mentioned above, or a hydrocarbon ring may be fused to each of the thiophene rings. The donor-acceptor molecule is preferably used together with a nickel-based reduction catalyst such as metallic nickel or a nickel oxide because the discharge capacity of the non-aqueous air battery can be markedly increased.

In the non-aqueous air battery of the present invention, the positive electrode may contain a conductive material. The conductive material is not particularly limited as long as the conductive material has conductivity. Examples of the conductive material include carbon black such as ketjen black, acetylene black, channel black, furnace black, lamp black, and thermal black; graphite such as natural graphite, e.g., flake graphite, artificial graphite, and expanded graphite; conductive fibers such as carbon fibers and metal fibers; powders of a metal such as copper, silver, nickel, or aluminum; and organic conductive materials such as polyphenylene derivatives. These conductive materials may be used alone or as a mixture of two or more materials.

In the non-aqueous air battery of the present invention, the positive electrode may contain a binder. Examples of the binder include, but are not particularly limited to, thermoplastic resins and thermosetting resins. Specific examples thereof include polyethylene, polypropylene, polytetrafluoroethylene (PTFE), polyvinylidene fluoride (PVDF), styrene-butadiene rubbers, tetrafluoroethylene-hexafluoroethylene copolymers, tetrafluoroethylene-hexafluoropropylene (FEP) copolymers, tetrafluoroethylene-perfluoroalkyl vinyl ether (PFA) copolymers, vinylidene fluoride-hexafluoropropylene copolymers, vinylidene fluoride-chlorotrifluoroethylene copolymers, ethylene-tetrafluoroethylene copolymers (ETFE resins), polychlorotrifluoroethylene (PCTFE), vinylidene fluoride-pentafluoropropylene copolymers, propylene-tetrafluoroethylene copolymers, ethylene-chlorotrifluoroethylene (ECTFE) copolymers, vinylidene fluoride-hexafluoropropylene-tetrafluoroethylene copolymers, vinylidene fluoride-perfluoromethyl vinyl ether-tetrafluoroethylene copolymers, and ethylene-acrylic acid copolymers. These resins may be used alone or as a mixture of two or more resins.

In the non-aqueous air battery of the present invention, the positive electrode may be produced by, for example, mixing the donor-acceptor molecule, the conductive material, and the binder, and then applying the mixture onto a current collector by press forming. In this step, the amount of donor-acceptor molecule used is not particularly limited, but may be, for example, in the range of 3 to 10 parts by weight relative to 100 parts by weight of the conductive material. Examples of the mixing method include wet blending in a solvent such as N-methylpyrrolidone and dry blending using a mortar and pestle. The current collector is not particularly limited. Specifically, for example, the current collector can be prepared by forming a single layer film or a multilayer film composed of a transparent conductive material such as $InSnO_2$, $SnO_2$, $ZnO$, or $In_2O_3$; or any of these transparent conductive materials into which an impurity is doped, e.g., fluorine-doped tin oxide ($SnO_2$:F), antimony-doped tin oxide ($SnO_2$:Sb), tin-doped indium oxide ($In_2O_3$:Sn), ZnO, aluminum-doped zinc oxide (Zno:Al), or gallium-doped zinc oxide (ZnO:Ga) on a glass plate or a polymer plate. The thickness of the film is not particularly limited, but is preferably in the range of about 3 nm to 10 μm. The surface of the glass plate or the polymer plate may be flat or may have irregularities. Alternatively, a metal plate or a metal mesh made of, for example, a stainless steel, aluminum, copper, or nickel may be used as a current collecting plate. Among these, a nickel mesh is preferably used from the standpoint that the discharge capacity of the non-aqueous air battery is markedly increased.

In the non-aqueous air battery of the present invention, the non-aqueous electrolyte is not particularly limited, but an electrolyte solution containing a supporting salt, a gel electrolyte, a solid electrolyte, or the like can be used as the non-aqueous electrolyte. Examples of the supporting salt include known supporting salts such as $LiPF_6$, $LiClO_4$, $LiBF_4$, $Li(CF_3SO_2)_2N$, $(C_2H_5)_4NBF_4$, $(C_4H_9)_4NBF_4$, $(C_2H_5)_4NPF_6$, and $(C_4H_9)_4NPF_6$. Examples of the supporting salt also include ionic liquids such as 1-methyl-3-propylimidazolium bis(trifluorosulfonyl)imide and 1-ethyl-3-butylimidazolium tetrafluoroborate. The concentration of the supporting salt is preferably in the range of 0.1 to 2.0 M, and more preferably, in the range of 0.8 to 1.2 M. Examples of the solvent of the electrolyte solution include organic solvents used for known secondary batteries and capacitors, such as ethylene carbonate (EC), propylene carbonate (PC), γ-butyrolactone (γ-BL), diethyl carbonate (DEC), and dimethyl carbonate (DMC). These may be used alone or in combinations of two or more solvents. Examples of the gel electrolyte include, but are not particularly limited to, gel electrolytes composed of a polymer such as poly (vinylidene fluoride), poly(ethylene glycol), or polyacrylonitrile; an amino acid derivative; or a saccharide such as a sorbitol derivative containing an electrolyte solution containing a supporting salt. Examples of the solid electrolyte include inorganic solid electrolytes and organic solid electrolytes. Well-known examples of the inorganic solid electrolytes include nitrides, halides, and oxoates of lithium (Li). Specific examples of the inorganic solid electrolyte include $Li_4SiO_4$, $Li_4SiO_4$—LiI—LiOH, $xLi_3PO_4$—$(1-x)Li_4SiO_4$, $Li_2SiS_3$, $Li_3PO_4$—$Li_2S$—$SiS_2$, and phosphorus sulfide compounds. These may be used alone or as a mixture of two or more compounds. Specific examples of the organic solid electrolytes include poly(ethylene oxide), poly(propylene oxide), poly(vinyl alcohol), poly (vinylidene fluoride), polyphosphazene, poly(ethylene sulfide), polyhexafluoropropylene, and derivatives thereof. These may be used alone or as a mixture of two or more polymers.

The non-aqueous air battery of the present invention may include a separator disposed between the negative electrode and the positive electrode. The separator is not particularly limited as long as the separator has a composition that can withstand the environment in which the non-aqueous air battery is to be used. Specific examples of the separator include polymer nonwoven fabrics such as a polypropylene nonwoven fabric and a poly(phenylene sulfide) nonwoven fabric, and microporous films made of an olefin resin such as polyethylene or polypropylene. These materials may be used alone or in combinations of two or more materials.

Figure 1:
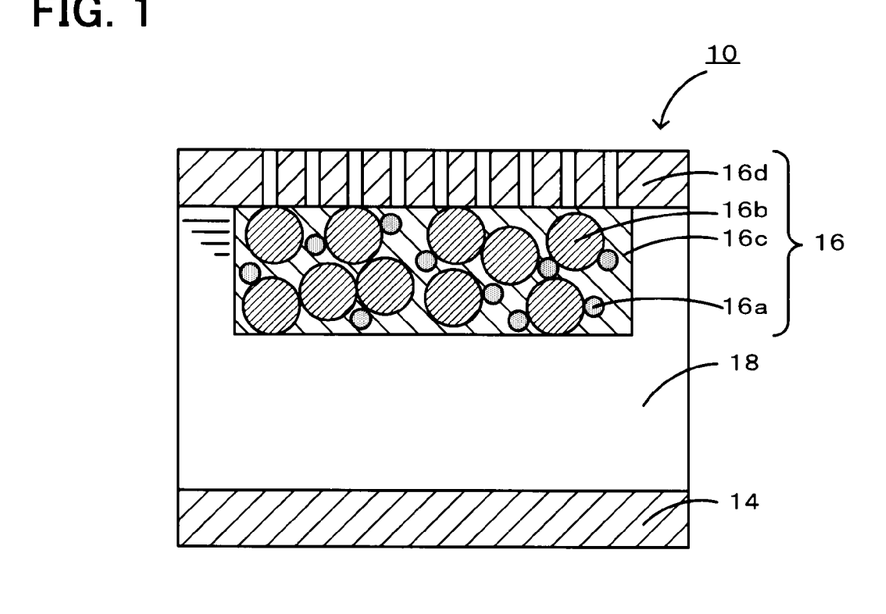
FIG. 1 is a schematic view of a non-aqueous air battery of the present invention.

Examples of the shape of the non-aqueous air battery of the present invention include, but are not particularly limited to, a coin shape, a button shape, a sheet shape, a laminate shape, a cylindrical shape, a laminar shape, and a rectangular shape. The non-aqueous air battery of the present invention may be applied to a large battery used for electric cars or the like. FIG. 1 schematically shows an example of a non-aqueous air battery of the present invention. In a non-aqueous air battery 10, a negative electrode 14 composed of a lithium metal foil and a positive electrode 16 containing donor-acceptor molecules 16a are separately disposed with a non-aqueous electrolyte solution 18 therebetween. The positive electrode 16 is prepared by mixing the donor-acceptor molecules 16a, a conductive material 16b, and a binder 16c, and then applying the mixture onto a nickel mesh 16d functioning as a current collector by press forming. The positive electrode 16 is provided so as to be in contact with oxygen.

EXAMPLES
Example 1

Figure 2:
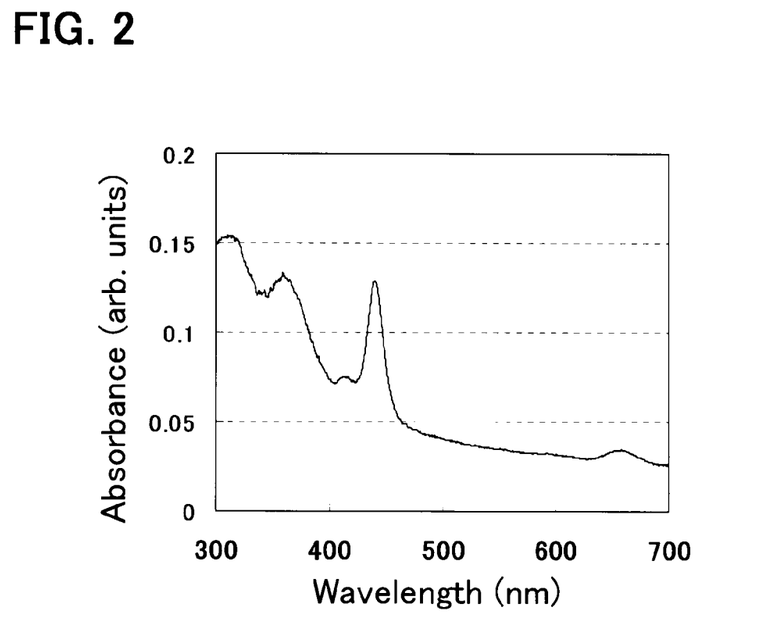
FIG. 2 is a chart of a UV spectrum of a donor-acceptor molecule of Example 1.

As a donor-acceptor molecule, triphenylporphyrinyl bithienyl N-methylpyrrolidino[60]fullerene (refer to Chemical Formula 1 below) in which triphenylporphyrin is connected to fullerene $C_{60}$ having a fused pyrrolidine ring, with bithiophene therebetween was synthesized as follows. Specifically, first, 100 mg of fullerene $C_{60}$ (manufactured by Aldrich) was dissolved in 100 mL of toluene at room temperature. The mixture was transferred to a 200-mL three-necked flask equipped with a dropping funnel, a condenser, and an argon inlet tube. Subsequently, 24.8 mg of N-methyl glycine (manufactured by Aldrich) was added to the solution. Furthermore, 10 mL of a dimethylformamide (DMF) solution containing 488 mg of triphenylporphyrinyl bithiophene aldehyde was added dropwise from the dropping funnel. Immediately after the completion of the dropwise addition, the reaction mixture was heated to reflux toluene, thus performing a reaction. After the reflux was performed for 15 hours, toluene and DMF were removed during deaeration. The resulting solid was dissolved again in toluene. The solution was purified by silica gel chromatography to remove unreacted fullerene $C_{60}$ and impurities. Thus, a target compound was prepared. The resulting black powder was dissolved in toluene to allow a UV-VIS spectrum thereof to be measured. As shown in FIG. 2, the spectrum showed peaks due to a porphyrin ring at 421 nm and 656 nm, a peak due to bithiophene at 367 nm, and a peak due to fullerene at 310 nm. Accordingly, it was determined that the target donor-acceptor molecule was produced.

[Chemical Formula 1]

Triphenylporphyrinyl bithiophene aldehyde mentioned above was synthesized as follows. First, 983 mg of benzaldehyde, 829 mg of pyrrole, and 601 mg of bithiophene aldehyde were placed in 150 mL of propionic acid, and a reaction was performed at 140° C. for three hours. After the completion of the reaction, the reaction solution was separated by chromatography, thus allowing 540 mg of triphenylporphyrinyl bithiophene to be prepared. Separately, 340 mg of phosphorus(III) oxychloride (manufactured by Aldrich) was slowly added dropwise to a sample bottle containing 640 mg of DMF in a glove box, and a reaction was performed. Subsequently, 10 mL of dichloroethane was added to 150 μL of the above solution, and the resulting mixture was then transferred to a 100-mL three-necked flask equipped with a dropping funnel, a condenser, and an argon inlet tube. Subsequently, 50 mL of dichloroethane containing 153.3 mg of triphenylporphyrinyl bithiophene synthesized above was slowly added dropwise to the flask from the dropping funnel at room temperature. Immediately after the completion of the dropwise addition, the flask was heated to 50° C. in an oil bath, and stirring was performed at 50° C. for three hours. Thus, triphenylporphyrinyl bithiophene aldehyde was prepared.

A positive electrode was prepared as follows. First, 146 mg of ketjen black (trade name: Printex, manufactured by Degussa), 10 mg of triphenylporphyrinyl bithienyl N-methylpyrrolidino[60]fullerene represented by Chemical Formula 1, and 12 mg of a Teflon™ powder (manufactured by Daikin Industries Ltd.) were kneaded using a mortar and pestle by a dry process to prepare a sheet-like positive electrode member. Subsequently, 6 mg of this positive electrode member was press-bonded onto a SUS 304 stainless mesh to prepare the positive electrode.

Figure 3:
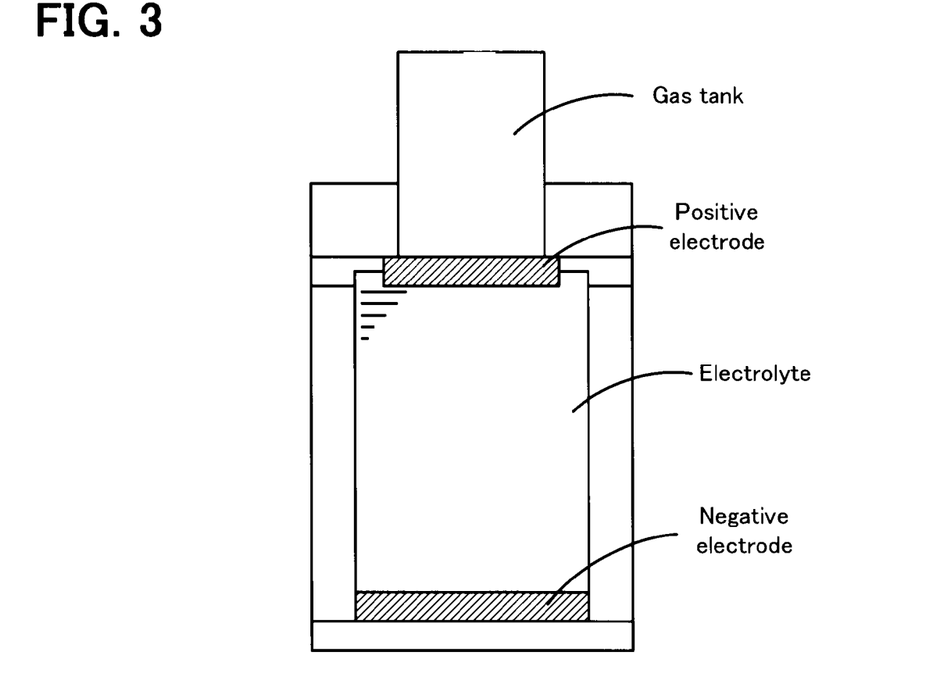
FIG. 3 is a schematic view of an F-type electrochemical cell.

Lithium (manufactured by Honjo Metal Co., Ltd.) having a diameter of 10 mm and a thickness of 0.5 mm was used as a negative electrode. The positive electrode and the negative electrode were placed in an F-type electrochemical cell manufactured by Hokuto Denko Corporation, which is schematically shown in FIG. 3, in a glove box in an argon atmosphere. Furthermore, 5 mL of a 1M ethylene carbonate-diethyl carbonate solution of lithium hexafluorophosphate (manufactured by Tomiyama Chemical Industries, Ltd.) was injected into the cell as an electrolyte solution. Dry oxygen was filled in a gas tank of the F-type electrochemical cell, thus preparing a non-aqueous air battery. In this F-type electrochemical cell, the positive electrode is electrically insulated from the negative electrode via a resin (not shown in the figure).

Figure 4:
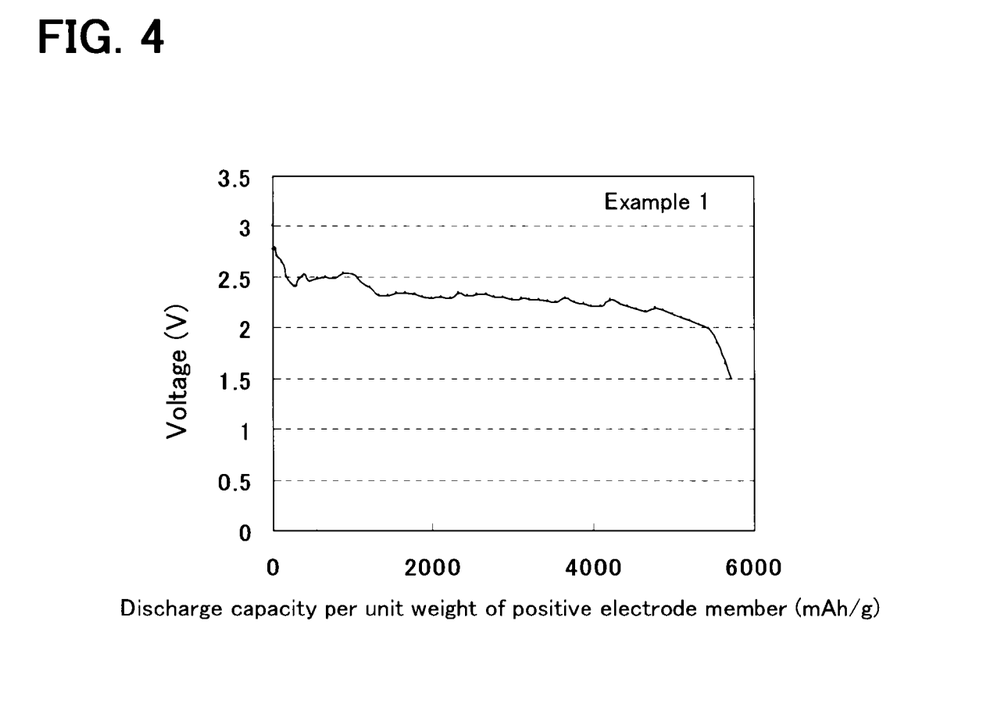
FIG. 4 is a graph showing a change in the open circuit voltage with time in Example 1.

The F-type electrochemical cell thus assembled was connected to a battery charge/discharge unit (model name: HJ1001SM8A) manufactured by Hokuto Denko Corporation. Subsequently, 0.1 mA of current was supplied between the positive electrode and the negative electrode, and discharge was performed until the open circuit voltage was decreased to 1.8 V. According to the result, the discharge capacity per unit weight of the positive electrode member was 5,272 mAh/g (refer to FIG. 4).

Comparative Example 1

Figure 5:
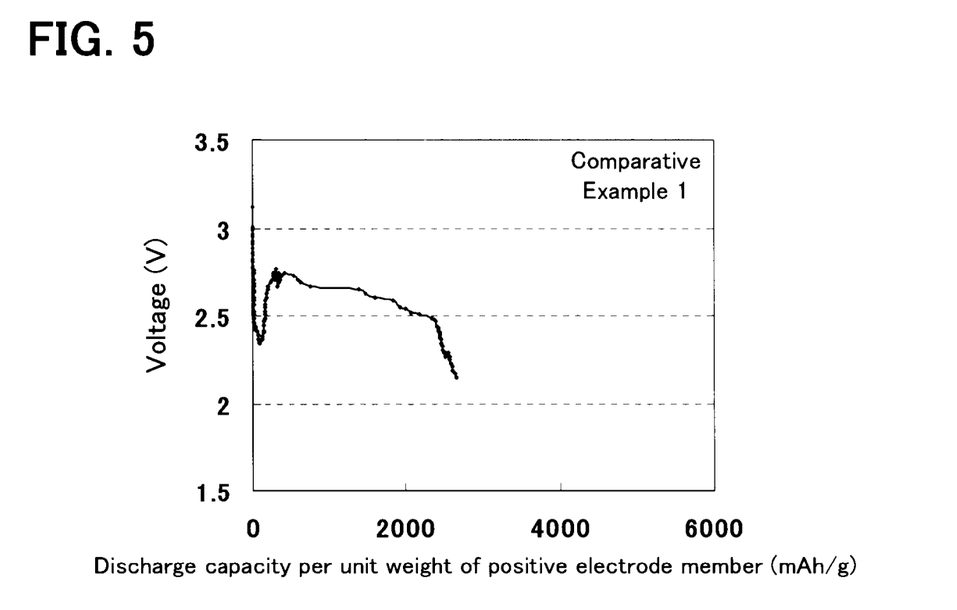
FIG. 5 is a graph showing a change in the open circuit voltage with time in Comparative Example 1.

A positive electrode member was prepared using electrolytic manganese dioxide (manufactured Mitsui Mining Co., Ltd.) instead of triphenylporphyrinyl bithienyl N-methylpyrrolidino[60]fullerene (refer to Chemical Formula 1) used in Example 1. More specifically, a non-aqueous air battery was assembled as in Example 1 except that a sheet-like positive electrode member was prepared using 220 mg of the ketjen black (trade name: Printex, manufactured by Degussa), 10 mg of the electrolytic manganese dioxide, and 10 mg of the Teflon™ powder (manufactured by Daikin Industries Ltd.). In this case, the discharge capacity per unit weight of the positive electrode member was 2,789 mAh/g (refer to FIG. 5).

Example 2

Figure 6:
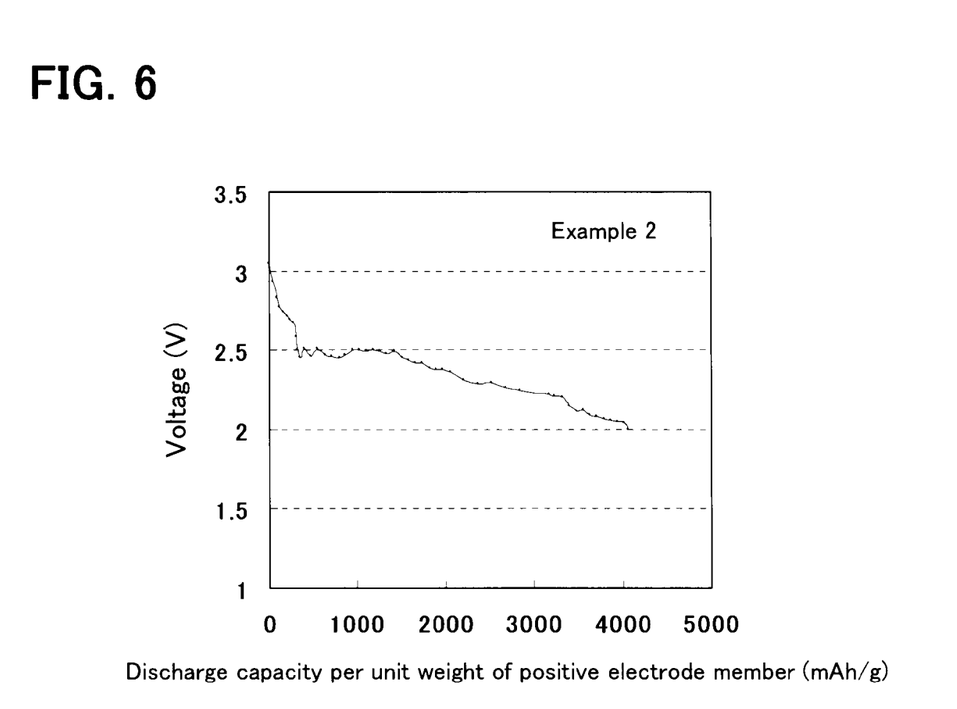
FIG. 6 is a graph showing a change in the open circuit voltage with time in Example 2.

A non-aqueous air battery was assembled as in Example 1 except that triphenylporphyrinyl bithienyl N-methylpyrrolidino[60]fullerene diethyl ester represented by Chemical Formula 2 was used instead of triphenylporphyrinyl bithienyl N-methylpyrrolidino[60]fullerene (refer to Chemical Formula 1) used in Example 1. Subsequently, 0.1 mA of current was supplied between the positive electrode and the negative electrode of this non-aqueous air battery, and discharge was performed until the open circuit voltage was decreased to 2 V. According to the result, the discharge capacity per unit weight of the positive electrode member was 4,065 mAh/g (refer to FIG. 6).

[Chemical Formula 2]

The compound represented by Chemical Formula 2 was prepared by using diethyl ester of fullerene $C_{60}$ instead of fullerene $C_{60}$ used in Example 1. Diethyl ester of fullerene $C_{60}$ was synthesized in accordance with a known method (Chemische Berichte, Vol. 126, pp. 1957-1959, 1993). More specifically, first, 210 mg of fullerene $C_{60}$ was dissolved in 100 mL of toluene, and the solution was then transferred to a 100-mL three-necked flask equipped with a condenser and an argon inlet tube. Subsequently, 99 mg of sodium hydride (30% liquid paraffin being added) and 104 mg of diethyl bromomalonate were added to the flask, and stirring was performed at room temperature for 6.5 hours to perform a reaction. Subsequently, eight drops of 2N sulfuric acid was added dropwise to the reaction solution, and anhydrous magnesium sulfate was added thereto. The reaction solution was left to stand for one hour to dehydrate the solution. Finally, the reaction solution was concentrated using an evaporator, and separated by silica gel chromatography. Thus, diethyl ester of fullerene $C_{60}$ was prepared.

Example 3

A non-aqueous air battery was produced as in Example 1 except that a nickel mesh (manufactured by Nilaco Corporation) was used instead of the stainless mesh. The measured discharge capacity per unit weight of the positive electrode member of this non-aqueous air battery was 14,560 mAh/g. This result showed that when donor-acceptor molecules were used in combination with nickel, the discharge capacity was markedly increased compared with the case where the donor-acceptor molecules were not used in combination with nickel (Example 1).

Comparative Example 2

Figure 7:
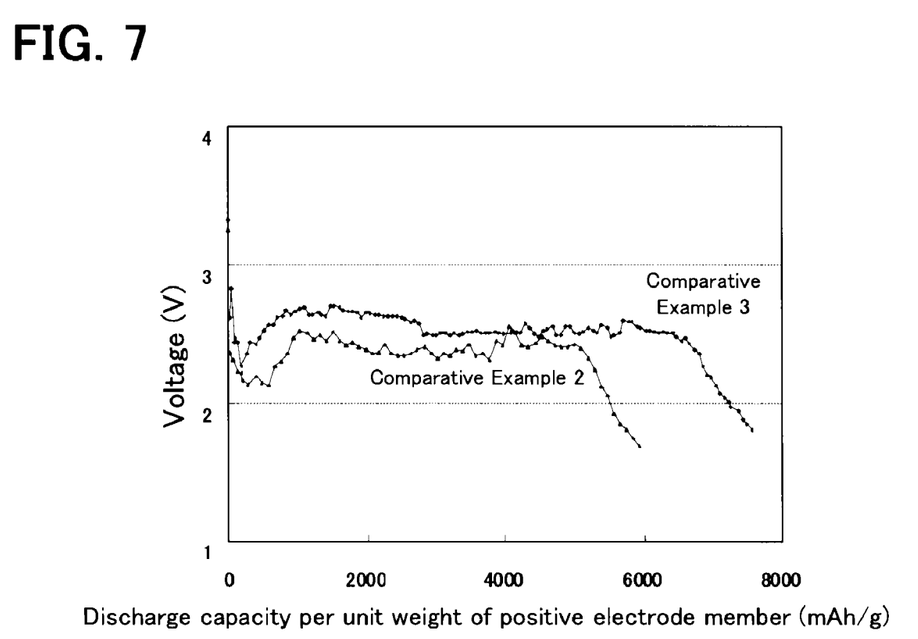
FIG. 7 is a graph showing a change in the open circuit voltage with time in Comparative Examples 2 and 3.

A non-aqueous air battery was produced as in Example 3 except that tetraphenylporphyrin (manufactured by Aldrich) serving as a donor molecule was used as a reduction catalyst instead of triphenylporphyrinyl bithienyl N-methylpyrrolidino[60]fullerene (refer to Chemical Formula 1) serving as a donor-acceptor molecule. The measured discharge capacity per unit weight of the positive electrode member of this non-aqueous air battery was 5,944 mAh/g (refer to FIG. 7).

Comparative Example 3

A non-aqueous air battery was produced as in Example 3 except that fullerene $C_{60}$ (manufactured by Tokyo Chemical Industry Co., Ltd.) serving as an acceptor molecule was used as a reduction catalyst instead of triphenylporphyrinyl bithienyl N-methylpyrrolidino[60]fullerene (refer to Chemical Formula 1) serving as a donor-acceptor molecule. The measured discharge capacity per unit weight of the positive electrode member of this non-aqueous air battery was 7,552 mAh/g (refer to FIG. 7).

This application claims priority from Japanese Patent Application No. 2007-146762 filed in the Japanese Patent Office on Jun. 1, 2007, which is hereby incorporated by reference herein in its entirety.

What is claimed is:

1. A non-aqueous air battery comprising:
a negative electrode comprising a material which absorbs and releases lithium ions:
a positive electrode for which oxygen is a positive electrode active material: and
a non-aqueous electrolyte disposed between the negative electrode and the positive electrode,
wherein the positive electrode contains a donor-acceptor molecule in which an electron-donating donor (D) having a porphyrin ring is bonded to an electron-accepting acceptor (A) composed of a fullerene derivative, by a conductive spacer therebetween
wherein the conductive spacer comprises a plurality of thiophene groups bonded to each other.

2. The non-aqueous air battery according to claim 1, wherein,
the fullerene derivative comprises at least one of a nitrogen-containing heterocyclic ring and a hydrocarbon ring fused to a fullerene skeleton of $C_{60}$, $C_{70}$, $C_{74}$, $C_{76}$, $C_{78}$, $C_{80}$, $C_{82}$, $C_{84}$, $C_{90}$, or $C_{96}$, and
the conductive spacer bonds the nitrogen-containing heterocyclic ring or the hydrocarbon ring to the electron-donating donor (D).

3. The non-aqueous air battery according to claim 2, wherein,
the fullerene derivative comprises a pyrrolidine ring fused to the fullerene skeleton of $C_{60}$, $C_{70}$, $C_{74}$, $C_{76}$, $C_{78}$, $C_{80}$, $C_{82}$, $C_{84}$, $C_{90}$, or $C_{96}$, and
the conductive spacer bonds the pyrrolidine ring to the electron-donating donor (D).

4. The non-aqueous air battery according to claim 2, wherein the conductive spacer comprising the plurality of thiophene rings is selected from the group consisting of bithiophene, tetrathiophene, hexathiophene, octathiophene, 3-hexylbithiophene, 3-butylbithiophene, and 3-octylbithiophene.

5. The non-aqueous air battery according to claim 4, wherein the conductive spacer comprising the plurality of thiophene rings is bithiophene.

6. The non-aqueous air battery according to claim 1, wherein the positive electrode further comprises a nickel based reduction catalyst.

7. The non-aqueous air battery according to claim 6, wherein the nickel based reduction catalyst is metallic nickel or a nickel oxide.

8. The non-aqueous air battery according to claim 1, wherein the positive electrode further comprises a conductive material selected from the group consisting of carbon black, graphite, a conductive fiber, a metal powder, an organic conductive material and a mixture thereof.

9. The non-aqueous air battery according to claim 1, wherein the positive electrode further comprises a binder selected from the group consisting of polyethylene, polypropylene, polytetrafluoroethylene (PTFE), polyvinylidene fluoride (PVDF), a styrene-butadiene rubber, a tetrafluoroethylene-hexafluoroethylene copolymer, a tetrafluoroethylene-hexafluoropropylene (FEP) copolymer, a tetrafluoroethylene-perfluoroalkyl vinyl ether (PFA) copolymer, a vinylidene fluoride-hexafluoropropylene copolymer, a vinylidene fluoride-chlorotrifluoroethylene copolymer, a ethylene-tetrafluoroethylene copolymer (ETFE resin), polychlorotrifluoroethylene (PCTFE), a vinylidene fluoride-pentafluoropropylene copolymer, a propylene-tetrafluoroethylene copolymer, a ethylene-chlorotrifluoroethylene (ECTFE) copolymer, a vinylidene fluoride-hexafluoropropylene-tetrafluoroethylene copolymer, a vinylidene fluoride-perfluoromethyl vinyl ether-tetrafluoroethylene copolymer, an ethylene-acrylic acid copolymer and a mixture thereof.

10. The non-aqueous air battery according to claim 1,
wherein the electron-donating donor (D) having the porphyrin ring is one selected from the group consisting of porphyrin, cytoporphyrin, uroporphyrin, coproporphyrin, hematoporphyrin, mesoporphyrin, protoporphyrin, rhodoporphyrin, phylloporphyrin, etioporphyrin, pyrroporphyrin, deuteroporphyrin, chlorin, bacteriporphyrin, isobacteriochlorin, porphyrinogen, phorbin, phytoporphyrin, porphyrazine, and phthalocyanine, wherein the porphyrin ring is optionally substituted with an alkyl group, an alkenyl group or an aryl group.

11. The non-aqueous air battery according to claim 10,
wherein the electron-donating donor (D) having the porphyrin ring is complexed with a metal.

12. The non-aqueous air battery according to claim 11,
wherein the metal is Mg or Ni.

13. The non-aqueous air battery according to claim 10,
wherein the electron-donating donor (D) having the porphyrin ring is triphenyl porphyrin.

14. The non-aqueous air battery according to claim 13,
wherein the conductive spacer comprising the plurality of thiophene rings is bithiophene and
the fullerene derivative comprises a pyrrolidine ring fused to a fullerene skeleton of $C_{60}$.

15. A positive electrode for a non-aqueous air battery, comprising:
a conductive material;
a catalyst to accelerate reduction of oxygen; and
optionally, a binder;
wherein
the catalyst is a donor-acceptor molecule comprising:
an electron-donating donor (D) having a porphyrin ring;
an electron-accepting acceptor (A) composed of a fullerene derivative and
a conductive spacer therebetween
wherein the conductive spacer comprises a plurality of thiophene groups bonded to each other.

16. The positive electrode according to claim 15, wherein,
the fullerene derivative comprises at least one of a nitrogen-containing heterocyclic ring and a hydrocarbon ring fused to a fullerene skeleton of $C_{60}$, $C_{70}$, $C_{74}$, $C_{76}$, $C_{78}$, $C_{80}$, $C_{82}$, $C_{84}$, $C_{90}$, or $C_{96}$, and
the conductive spacer bonds the nitrogen-containing heterocyclic ring or the hydrocarbon ring to the electron-donating donor (D).

17. The positive electrode according to claim 16, wherein,
the fullerene derivative comprises a pyrrolidine ring fused to the fullerene skeleton of $C_{60}$, $C_{70}$, $C_{74}$, $C_{76}$, $C_{78}$, $C_{80}$, $C_{82}$, $C_{84}$, $C_{90}$, or $C_{96}$, and the conductive spacer bonds the pyrrolidine ring to the electron-donating donor (D).

18. The positive electrode according to claim 15, further comprising a nickel based reduction catalyst.

19. The positive electrode according to claim 18, wherein the nickel based reduction catalyst is metallic nickel or a nickel oxide.

20. The positive electrode according to claim 15, wherein,
the porphyrin ring is triphenyl porphyrin,
the conductive spacer comprising the plurality of thiophene tings is bithiophene, and
the fullerene derivative comprises a pyrrolidine ring fused to a fullerene skeleton of $C_{60}$.

* * * * *